United States Patent [19]
Fukuchi et al.

[11] Patent Number: 5,568,271
[45] Date of Patent: Oct. 22, 1996

[54] IMAGE INFORMATION RECORDING APPARATUS FOR RECORDING A PLURALITY OF IMAGE INFORMATION ONTO A PLURALITY OF INFORMATION RECORDING MEANS

[75] Inventors: Masami Fukuchi, Chofu; Yoshitaka Miyoshi; Masahide Kanno, both of Hachioji; Shin-ichiro Hattori, Akishima; Kazunari Nakamura, Hino; Keiichi Hiyama, Akishima; Jun Hasegawa, Hino, all of Japan

[73] Assignee: Olympus Optical Co., Ltd., Tokyo, Japan

[21] Appl. No.: 407,055

[22] Filed: Mar. 17, 1995

Related U.S. Application Data

[63] Continuation of Ser. No. 977,175, Nov. 16, 1992, abandoned.

[30] Foreign Application Priority Data

Nov. 22, 1991 [JP] Japan ................... 3-308027

[51] Int. Cl.$^6$ ................................ H04N 5/76
[52] U.S. Cl. ............... 386/46; 348/74; 348/75; 386/109; 386/125
[58] Field of Search ............... 348/65, 74, 75; 358/335, 342; 360/33.1; H04N 5/76

[56] References Cited

U.S. PATENT DOCUMENTS

| | | | |
|---|---|---|---|
| 4,797,752 | 1/1989 | Giddings | 358/342 |
| 5,111,306 | 5/1992 | Kanno et al. | 358/403 |
| 5,138,503 | 8/1992 | Nishida | 358/909 |
| 5,200,863 | 4/1993 | Orii | 360/33.1 |
| 5,209,220 | 5/1993 | Hiyama et al. | 358/98 |
| 5,216,518 | 6/1993 | Yamagami | 358/426 |
| 5,239,428 | 8/1993 | Nishida et al. | 360/72.2 |

*Primary Examiner*—Thai Q. Tran
*Assistant Examiner*—Khoi Truong
*Attorney, Agent, or Firm*—Armstrong, Westerman, Hattori, McLeland & Naughton

[57] ABSTRACT

An endoscope image recording apparatus comprises a video endoscope having, at a forward end of an inserting section, an image pickup element, for image-picking-up the interior of a body cavity or the like, an image control unit for signal-processing a picture signal from the video endoscope, to generate an image signal, a portable IC memory card for recording the image signal from the image control unit as image data, a digital audio tape (DAT), a monitor for displaying the image signal from the image control unit or image data recorded on the IC memory card or the DATA, and indication means for indicating control operation to the image control unit. The IC memory card and the DAT tape record a serial number of the image, an INDEX image of the image, patient data, and image data. The IC memory card records an ID number of the DAT tape, while the DAT tape records an ID number of the IC memory card.

20 Claims, 20 Drawing Sheets

| IMAGE NO. | INDEX IMAGE | PATIENT DATA | IMAGE DATA | DAT ID. NO |

| IMAGE NO. | INDEX IMAGE | PATIENT DATA | IMAGE DATA | CARD ID. NO |

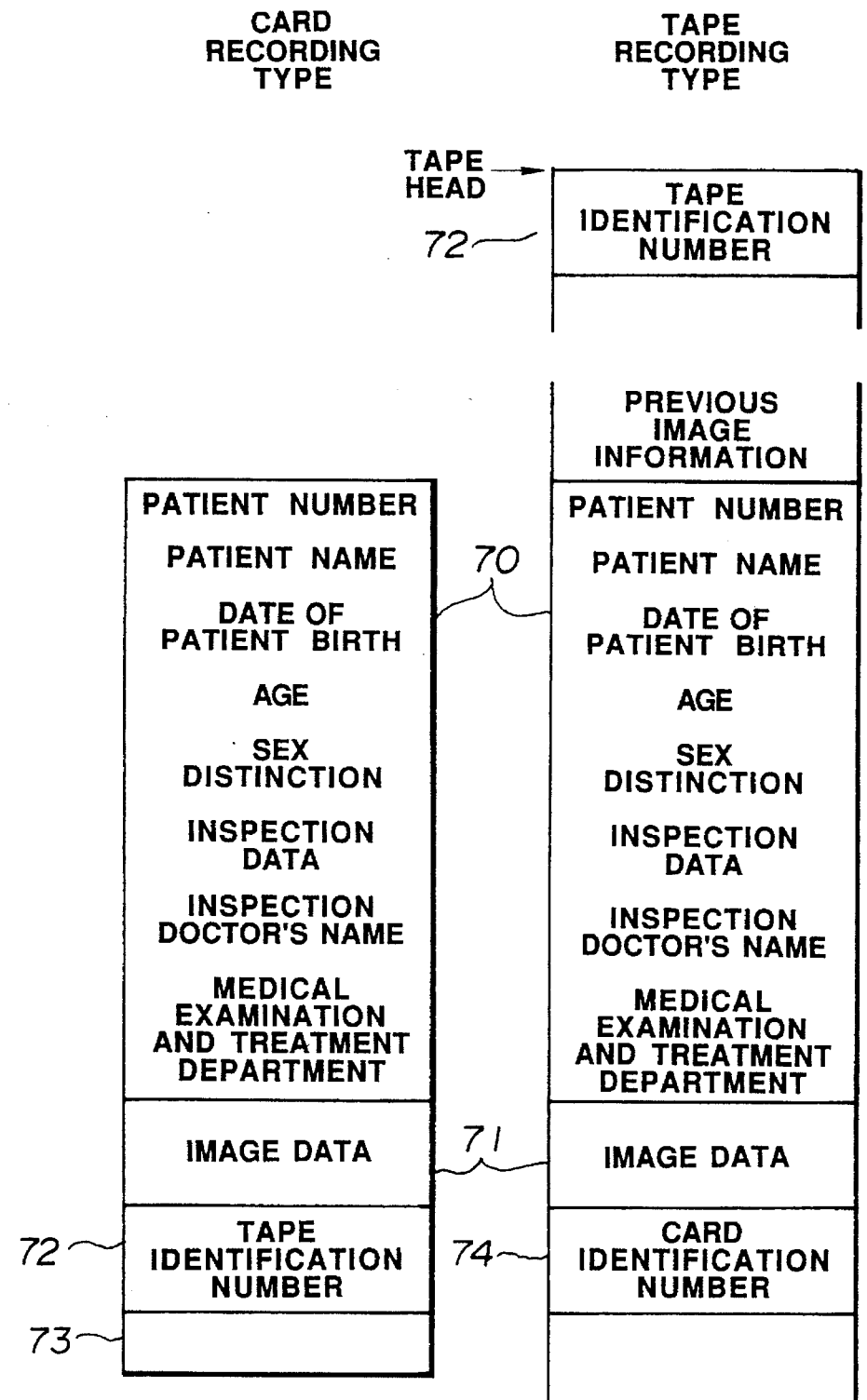

FIG.20

| | | |
|---|---|---|
| INPUT OF RETRIEVAL CONDITION | | |
| INSPECTION NUMBER | =10 | ~80 |
| DATE OF INSPECTION | =? | ~81 |
| NAME | =? | |
| INSPECTION DOCTOR'S NAME | =? | |
| PUSH "RET" KEY AFTER CONDITION HAS BEEN INPUTTED | | |

FIG.21

| NUMBER | DATA OF INSPECTION | NAME |
|---|---|---|
| 1 | 91-11-01 | ABC |
| 2 | 91-11-02 | DEF |
| 3 | 91-11-03 | GHI |
| 4 | 91-11-04 | JKL |
| 5 | 91-11-05 | MNO |

IMAGE INFORMATION RECORDING APPARATUS FOR RECORDING A PLURALITY OF IMAGE INFORMATION ONTO A PLURALITY OF INFORMATION RECORDING MEANS

This application is a Continuation application of Ser. No. 07/977,175, filed Nov. 16, 1992, now abandoned.

BACKGROUND OF THE INVENTION

1. Field of the Invention

The present invention relates to an image information recording apparatus for recording a plurality of image information onto a plurality of information recording means to execute backup of the image information.

2. Related Art and Prior Art Statement

It is executed for an electronic camera or the like to record an image to a memory card. The memory card is high in speed as compared with a mechanical medium such as a floppy disc or the like. On the other side, since the memory card is high in cost or price, the memory card is not suited for conservation for a long time. Chief or principal uses of the memory card are conservation for a short time such as data carrier or the like for instruments, and rewriting is frequently made to the memory card.

As disclosed in Japanese Patent Laid-Open No. HEI 2-142582, for example, an electronic endoscope apparatus has been proposed which uses such a memory card to record and manage an endoscope image.

By the way, not limited to the memory card, in order to raise reliability of the recorded data, an arrangement in which the same data are recorded double onto a recording apparatus different from the primary recording apparatus, so-called backup has widely been adopted. In a case where a fault or impediment occurs in the primary recording apparatus, a method has been taken in which the recording is found out or located from the backup recording apparatus, and is restored.

However, the conventional electronic endoscope apparatus has the following problems. That is, the information recorded into the primary recording apparatus and information connected with the information recorded into the backup recording apparatus are managed discretely or separately from each other. Accordingly, in a case where a fault or impediment occurs in the primary recording apparatus, it takes much time or it is troublesome to find out the recording from the backup recording apparatus to return the information.

OBJECTS AND SUMMARY OF THE INVENTION

It is an object of the invention to provide an image information recording apparatus which is provided with a plurality of image information recording means for recording image information, at least one of the image information recording means being portable, the plurality of image information recording means recording identification codes of the plurality of image information recording means associated with each other, together with the image information, whereby, in a case where a fault or impediment occurs in at least one image information recording medium, the identification codes are retrieved from the remaining image information recording means, thereby to find out the image information simply and speedily or at a high speed and to return the image information easily.

It is another object of the invention is to provide an image information recording apparatus provided with a plurality of image information recording means for recording image information at least one of which is portable, wherein the plurality of image information recording means records identification codes of the plurality of image information recording means associated with each other, together with the image information, whereby, in a case where a failure or impediment occurs in at least one image information recording means, the identification codes are retrieved from the remaining image information recording means so that the image information is found out or located simply and at a high speed; thus, it is possible to easily return the image information and, further, at least one of the plurality of image information recording means records the image information in encoding, whereby image recording can be executed efficiently.

An image information recording apparatus according to the invention comprises a plurality of image information recording means for recording one of an image signal and image information in which the image signal is encoded, identification information generating means for generating identification information related to each other corresponding respectively to the plurality of image information recording means, and recording control means for applying an identification code to the image information recorded by the plurality of image information recording means to record the identification code, wherein at least one of the plurality of image information recording means is portable information recording means for recording the image information onto a portable information recording medium.

BRIEF DESCRIPTION OF THE DRAWINGS

FIGS. 1 through 8 are views showing a first embodiment of the invention, FIG. 1 being an arrangement view showing a structure of an endoscope image recording apparatus, FIGS. 2a and 2b being a recording format of image data recorded on an IC memory card and a DAT, FIG. 3 being an arrangement view showing a structure of the IC memory card, FIG. 4 being an arrangement view showing a structure of an ID section of the IC memory card, FIG. 5 being an arrangement view showing a structure of an input port of the IC memory card, FIG. 6 being an arrangement view showing a structure of a modification of the ID section of the IC memory card, FIG. 7 being a flow chart showing a flow of function of the endoscope image recording apparatus, and FIG. 8 being a flow chart showing a flow of data return in a case where image data of the IC memory card are damaged;

FIGS. 9 through 21 are views showing a second embodiment of the invention, FIG. 9 being an arrangement view showing a structure of an endoscope image recording apparatus, FIG. 10 being an arrangement view showing a structure of an image compression unit, FIG. 11 being an explanatory view describing a quantization characteristic of a quantizer, FIG. 12 being an arrangement view showing a structure of an image input unit, FIG. 13 being an explanatory view describing a first display example of a CRT, FIG. 14 being an arrangement view showing a structure of an image expansion unit, FIG. 15 being an arrangement view showing a structure of a card interface, FIG. 16 being an arrangement view showing a structure of an IC memory card, FIG. 17 being a recording format of image data recorded on the IC memory card and the DAT, FIG. 18 being a recording format of the image data recorded on an HDD, FIG. 19 being a flow chart showing a flow of operation of retrieving and displaying of the image information, FIG. 20 being an explanatory view describing a second display example of a CRT, and FIG. 21 being an explanatory view describing a third display example of the CRT.

DETAILED DESCRIPTION OF THE PREFERRED EMBODIMENTS

Figure 1:
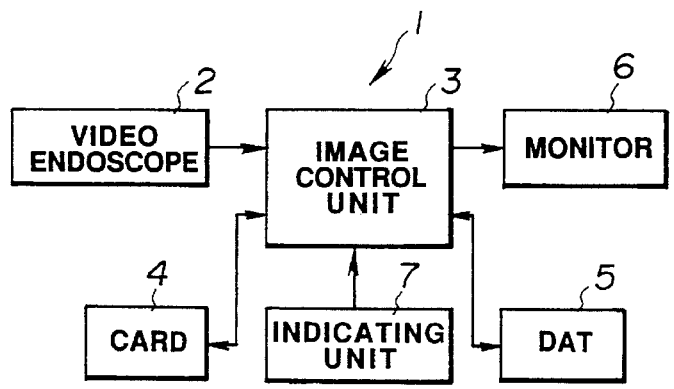

As shown in FIG. 1, an endoscope image recording apparatus 1 comprises a video endoscope 2 provided with image conversion means having, at a forward end of an inserting section, an image pickup element, for observing the interior of a body cavity or the like to convert an endoscope image to a picture signal, an image control unit 3 serving as signal processing means and recording control means for signal-processing the picture signal from the video endoscope 2 to generate an image signal, an IC memory card 4 serving as portable image recording means formed by, for example, a semiconductor memory or the like for recording the image signal signal-processed by the image control unit 3 as image data, a DAT (magnetic tape) 5 serving as image recording means having large capacity, a monitor 6 for displaying the image signal-processed by the image control unit 3 or image data played back by the image control unit 3 and recorded onto the IC memory card 4 or the DAT 5, and an indication unit 7 formed by a keyboard or the like for indicating control operation to the image control unit 3.

FIG. 2 shows a recording format of the image data. a indicates a recording format of the IC memory card 4, in which a serial number of the image, an INDEX image (reduced image) of the image, patient data, image data, and an ID number of a backup DAT tape are recorded. Similarly, b indicates a recording format of the DAT tape 5, in which a serial number of the image, an INDEX image of the image, patient data, image data, and an ID number of the IC memory card are recorded.

Figure 3:
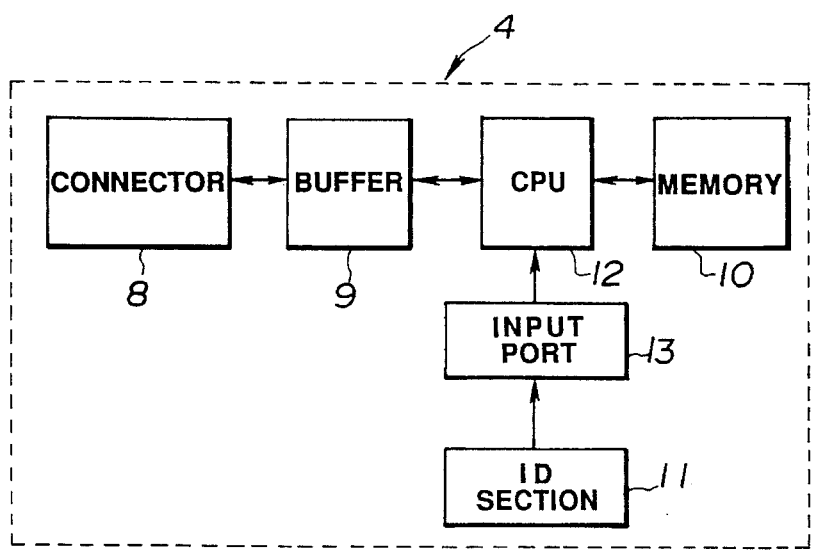

As shown in FIG. 3, the IC memory card 4 is provided with a connector section 8 for executing electric connection to the image control unit 3, a buffer circuit 9 for buffering signals of the connector section 8 and an internal circuit, a memory 10 for recording image data from the image control unit 3, an ID section 11 for recording an ID code corresponding to an ID number of the IC memory card 4, a CPU 12 for executing control of signals from the buffer circuit 9 and the memory 10, and an input port 13 in which the ID code of the IC memory card 4 recorded onto the ID section 11 is inputted to the CPU 12.

Figure 4:
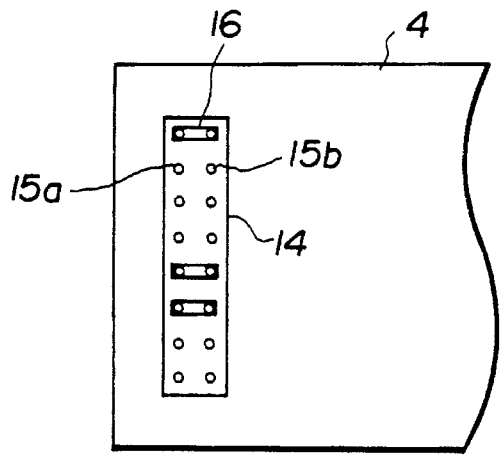

As shown in FIG. 4, the ID section 11 is so arranged as to be provided with required set number (eight sets in FIG. 4, for example) of signal pins 15a and 15b two of each of which form a set, on a proximal end 14 provided on the IC memory card 4. A signal pin 15 is connected by a short bar 16 corresponding to the ID number, to set the ID code.

Figure 5:
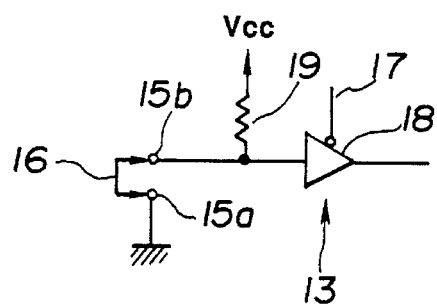

As shown in FIG. 5, the input port 13 has an input buffer 18 whose output is controlled by a control signal 17 from the CPU 12, and a resistor 19 connected to an input of the input buffer 18, for normally defining a logic "1". The signal pin 15a connected to the input of the input buffer 18 and the signal pin 15b connected to the ground are short-circuited to each other by the short bar 16, to set a logic "0". In this connection, the input port 13 is provided correspondingly to a required set number of the signal pins 15a and 15b.

Actual operation of such IC memory card 4 is such that, at recording, the image data is turned over to the CPU 12 from the image control unit 3 through the connector section 8 and the buffer circuit 9, and are recorded within the memory 10. At reading, the image data from the memory 10 are read by the CPU 12, and are turned over to the image control unit 3 through the buffer circuit 9 and the connector section 8. At confirmation of the ID number, the set ID code condition of the ID section 11 is read by the CPU 12 within the input port 13 through the input buffer 18 by the control signal 17 from the CPU 12, and is turned over to the image control unit 3 through the buffer circuit 9 and the connector section 8.

Figure 6:
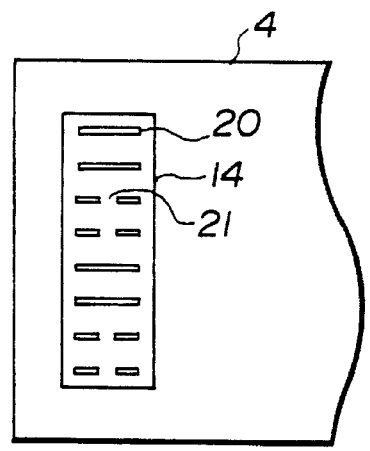

In connection with the above, the ID code of the IC card is such that peculiar or inherent data are set at, for example, manufacturing. Further, as shown in FIG. 6, the ID section 11 may be realized in such a manner that a short pattern 20 is beforehand made up, and a pattern cut is executed by laser trimming or the like as occasion demands, to provide cut sections 21. Moreover, the ID card may be realized by the fact that recording is executed in the non-volatile memory 10 within the IC card by the image control unit 3.

Operation of the endoscope image recording apparatus 1 arranged in this manner will be described with reference to a flow.

Figure 7:
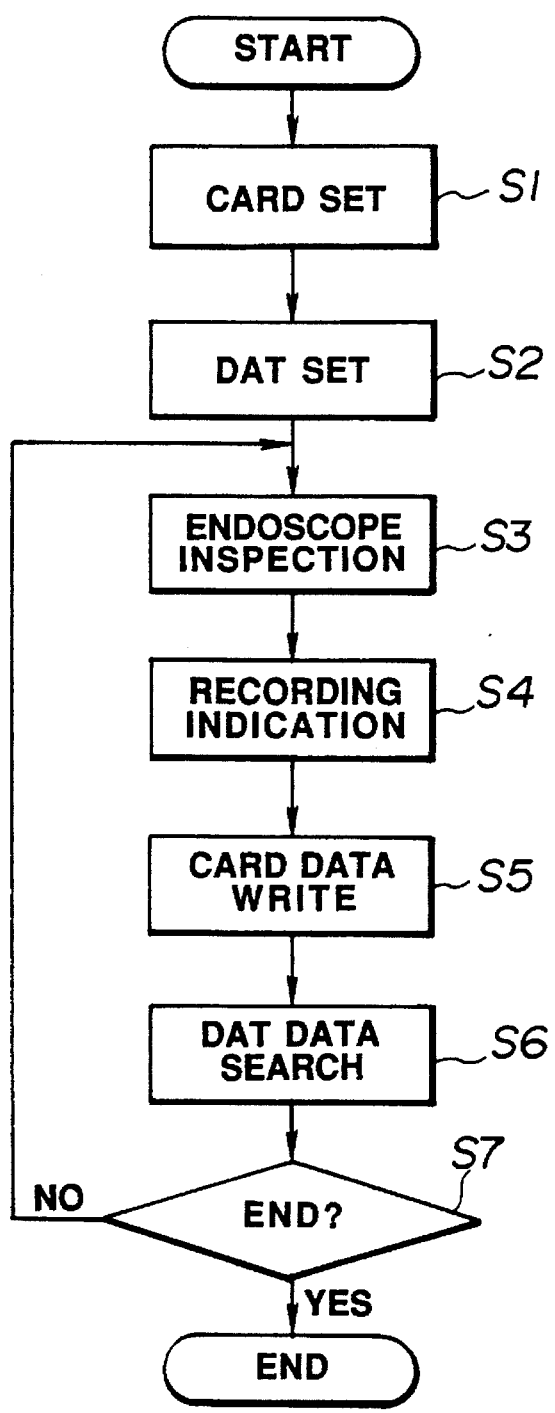

As shown in FIG. 7, first, the IC memory card 4 for recording the image is set to the image control unit 3, and the DAT tape is set to the DAT 5 (S1, S2). The video endoscope 2 is operated to execute inspection (S3). At a required image, a recording indication is issued by the indication unit 7 (S4). An image is recorded onto the IC memory card 4 (S5). The same image is recorded onto the DAT tape by the DAT 5 (S6). If the inspection ends here, the inspection ends. If the inspection does not end, the inspection continues (S7).

Figure 8:
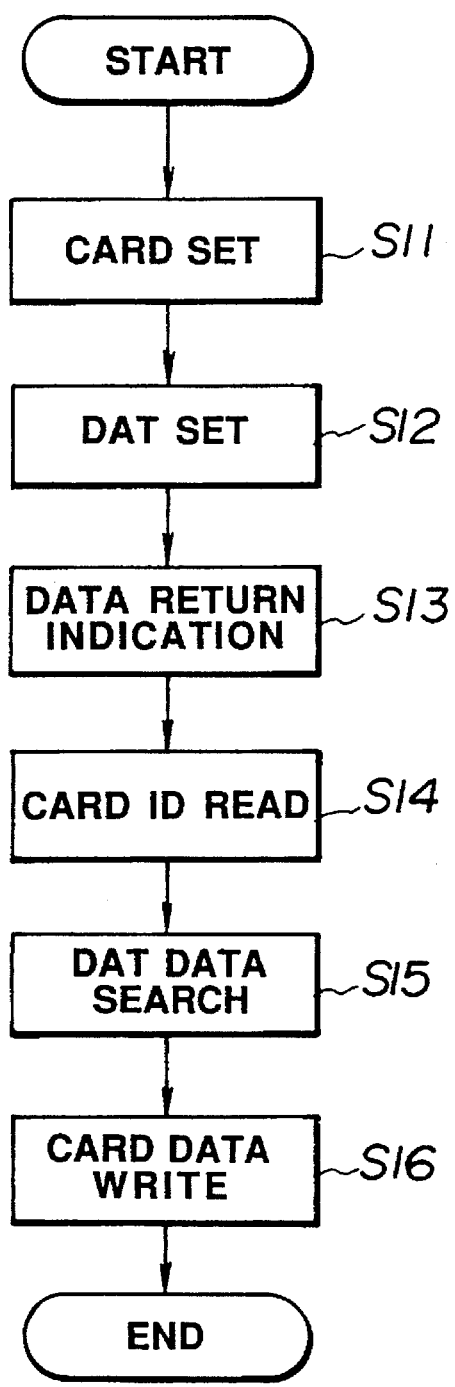

FIG. 8 shows an operation flow of data return in a ease where the image data of the IC memory card are damaged at carrying. First, the IC memory card 4 in which the image data are required to be returned is set (S11). Subsequently, the DAT tape backed up is set to the DAT 5 (S12). Data return indication is issued by the indication unit 7 (S18). The ID number of the IC memory card 4 is read (S14). Data within the DAT tape are retrieved by the ID number (S15). The retrieved image data are recorded onto the IC memory card 4 (S18). Operation ends as mentioned above.

In this manner, the endoscope image recording apparatus according to the first embodiment has the following advantages. That is, the endoscope image is recorded to the IC memory card and the DAT tape. Simultaneously, the identification code of the DAT tape is recorded onto the IC memory card, and the identification code of the IC memory card is recorded onto the DAT tape. Accordingly, in a case where the image data of the IC memory card is damaged, the identification code of the IC memory card recorded on the DAT tape is retrieved whereby the damaged image data can easily be returned. In this connection, similarly at damage of the image data of the DAT tape, the image data can be returned from the IC memory card.

In connection with the above, the endoscope image recording apparatus has been arranged by the use of the DAT as the image recording means having large capacity. However, the invention should not be limited to this specific arrangement. For example, image recording means having large capacity may be formed by a hard-disc unit or the like.

A second embodiment of the invention will next be described.

The second embodiment of the invention relates to an endoscope image recording apparatus which includes a first image recording unit serving as a satellite system arranged in a clinical room, and a second image recording unit serving as a conference system arranged within a display room.

Figure 9A:
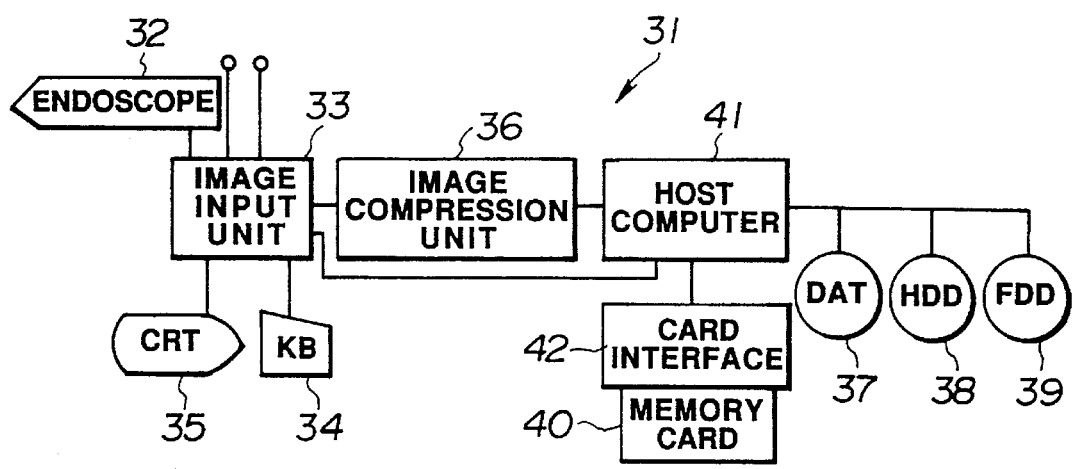

As shown in FIG. 9(a), a first image recording unit 31 serving as a satellite system of the endoscope image recording apparatus according to the second embodiment comprises a video endoscope 32 having, at a forward end of an inserting section, an image pickup element for observing the interior of a body cavity or the like, an image input unit 33 for signal-processing a picture signal from the video endoscope 32, to generate an image signal, a keyboard (hereinafter simply referred to as "K.B") 34 serving as input means for inputting observed patient information and for assigning processing contents to the image input unit 33, a CRT 35 serving as display means for displaying the image signal generated by the image input unit 33, an image compression unit 36 for compressing the image signal generated by the image input unit 33, a digital audio tape unit (hereinafter simply referred to "DAT") 37 serving as a plurality of image recording means for recording the image signal generated by the image input unit 33 or the compressed image signal compressed by the image compression unit 36, a disc-type recording unit, for example, a hard disc drive (hereinafter simply referred to as "HDD") 38, a floppy disc drive (hereinafter simply referred to as "FDD") 39 and an IC memory card 40, a first host computer 41 for executing control of recording the image signal generated by the image input unit 33 or the compressed image signal compressed by the image compression unit 36 to the plurality of image recording means, and a card interface 42 by which the IC memory card 40 is connected to the first host computer 41. The image input unit 33 is provided with a button-type switch 43 for fetching an image to be recorded.

Figure 10:
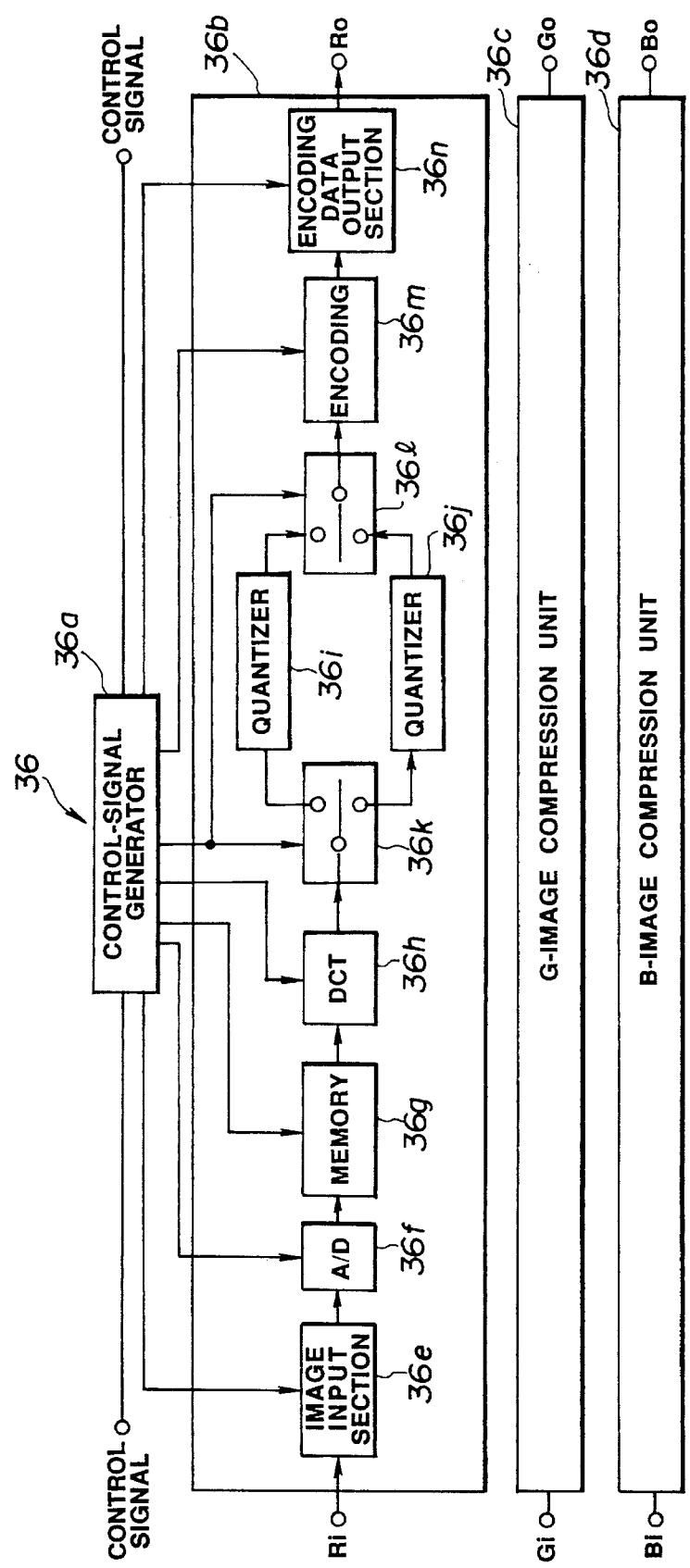

As shown in FIG. 10, the image compression unit 36 has a control-signal generator 36a for generating a control signal used within the image compression unit 36 by a control signal from the first host computer 41, and an R-image compression unit 36b, a G-image compression unit 36c and a B-image compression unit 36d for compressing R, G and B image signals. Here, the R-image compression unit 36b will be described. However, the same is applicable to the G-image compression unit 36c and the B-image compression unit 36d.

The R-image compression unit 36b is provided with an image input section 36e for inputting an R-image signal Ri from the image input unit 33, an A/D converter 36f for A/D-converting the R-image signal Ri through the image input section 36e, a memory 36g for recording a digital R-image signal A/D-converted by the A/D converter 36f, and a DCT converter 36h for DCT-converting (discrete-cosine converting) the digital R-image signal recorded on the memory 36g.

Further, the R-image compression unit 36b comprises a normal-image quantizer 36i for quantizing DCT image data DCT-converted by the DCT converter 36h in a case where the R-image signal Ri from the image input unit 33 is a normal image signal, a dyeing image quantizer 36j for quantizing DCT image data in case where the R-image signal Ri from the image input unit 33 is a dyeing image signal, a first switch 36k for switching the DCTR image signal from the DCT converter 36h to output the switched DCTR signal to the normal image quantizer 36i or the dyeing-image quantizer 36j, a second switch 36l for switching quantized data from the normal image quantizer 36i or the dyeing-image quantizer 36j to input the switched quantized data, an encoder 36m for encoding quantized data through the second switch 36l to generate encoded data, and an encoded-data output section 36n for outputting the quantized data Ro from the encoder 36m to the first host computer 41.

That is, each image signal from the input image unit 33 is converted to a digital image signal by the A/D converter 36f through the image input portion 36e, and is recorded to the memory 36g. The recorded R, G and B digital image signals are read from the memory 36g by the control signal from the control-signal generator 36a, and are inputted to the DCT converter 36h. The DCT-converted DCT image data are switched to any one of the normal image quantizer 36i and the dyeing image quantizer 36j by the first switch 36k, and are inputted. The quantized data outputted from the switched normal image quantizer 36i or the switched dyeing image quantizer 36j are inputted to the encoder 36m and are encoder. Subsequently, the encoded data are outputted from the encoded data output section 36n.

Here, the reason why the normal image quantizer 36i or the dyeing image quantizer 36j is used in switching will be described.

In a case where the dyed endoscope image is quantized by the use of the normal image quantizer 36i, there occurs a problem that block strain or distortion or the like is generated because a high cyclic component of the dyeing image is coarsely quantized. In view of this, in a case where the dyed endoscope image is fetched by the image input unit 33, it is required that the quantization characteristic of the quantizer is switched for the normal endoscope image and for the dyeing image.

The quantization characteristic of the quantizer will be described by the use of FIGS. 11(a). 11(b) and 11(c).

Figure 11A:
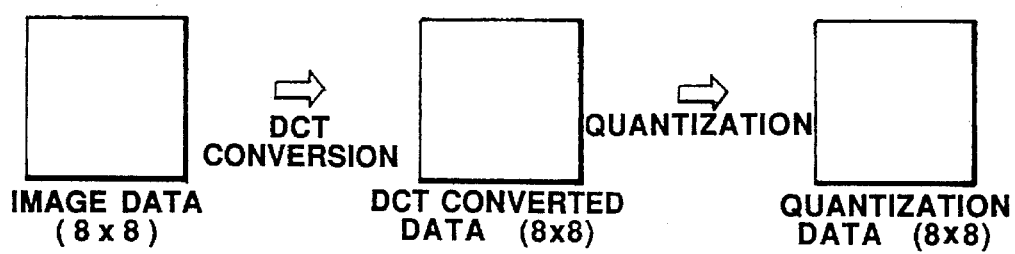
Figure 11B:
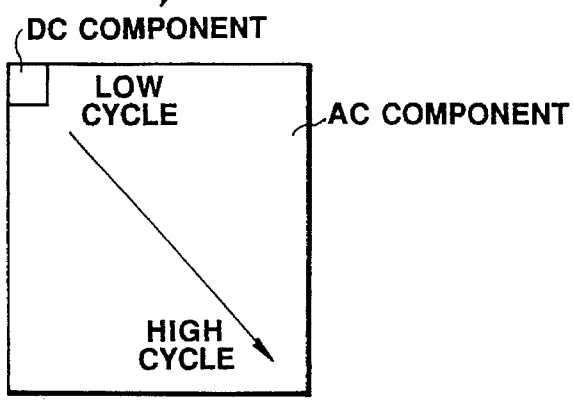

FIG. 11(a) shows a flow until the image data that are the digital image signals are quantized. As shown in FIG. 11(b), the image data are converted into a DC component (direct current component) and an AC component (alternate current component) by the DCT conversion. The data of AC component are distributed on a low cyclic component and a high cyclic component as shown in FIG. 11(a).

Figure 11C:
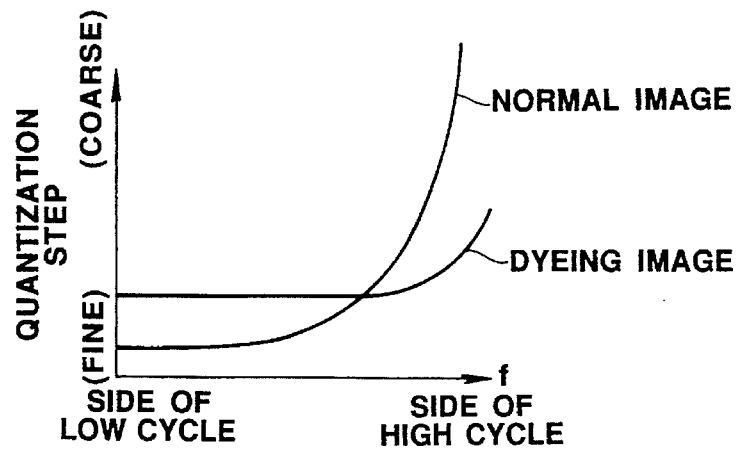

Since the normal endoscope image does not contain many high cyclic component of the AC component, it is possible to coarsely quantize the normal endoscope image on the side of high cycle. Since the dyeing image contains much high cyclic component, the side on the high cycle is finely quantized whereby it is possible to prevent block distortion or the like from occurring. FIG. 11(c) shows quantization characteristics of the normal-image quantizer 36i and the dyeing-image quantizer 36j.

Figure 12:
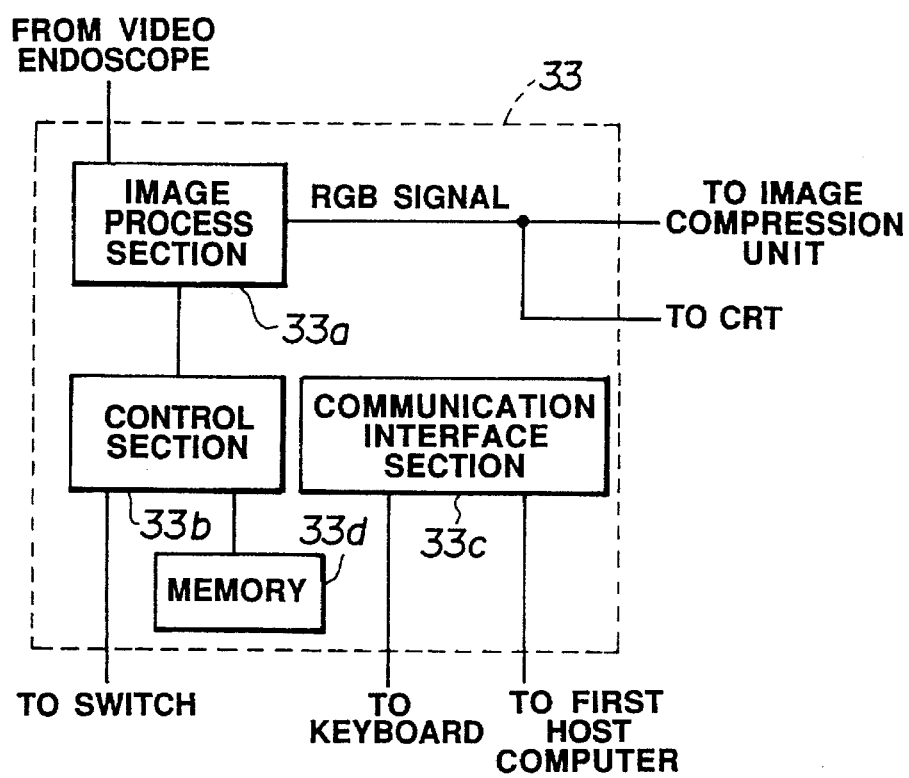

FIG. 12 shows the details of the image input unit 33. An image process section 33a converts an electric signal from the video endoscope 32 to the RGB video signals, to execute balance of the RGB signals and adjustment or regulation of the signal level. Furthermore, patient information and message to an operator sent from a control section 33b to be described subsequently are synthesized with the aforesaid RGB signals. A communication interface section 33c executes inputting and outputting of a command with respect to the encoded patient information and the control section 33b. The reference numeral 33d denotes a memory for recording therein the patient information. The control section 33b controls the image process section 33a, the communication interface section 33c and the memory 33d of the image input unit 33.

Figure 13:
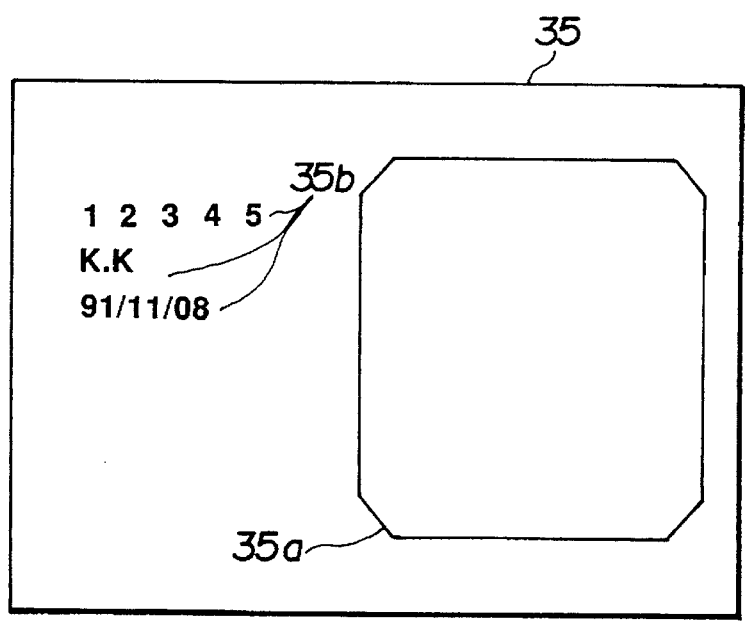

The image synthesized by the control section 33b is outputted to the CRT 35 and the image compression unit 36. The image is displayed at once on the CRT 35. FIG. 13 shows an example of display on the CRT 35. The reference numeral 35a denotes an image which is image-picked up by the video endoscope 32. The reference numeral 35b denotes patient information.

Figure 9B:
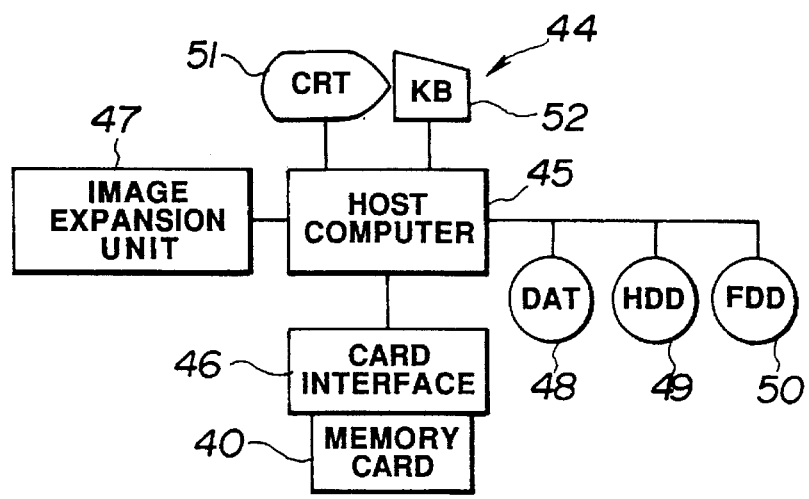

As shown in FIG. 9(b), a second image recording unit 44 serving as a conference system comprises a second host computer 45 for reading the image signal or the compression image signal recorded on the IC memory card 40, a card interface 46 for connecting the IC memory card 40 to the second host computer 45, an image expansion unit 47 for expanding the compression image signal read by the second host computer 45 to playback the expanded compression image signal to an image signal, a DAT 48, an HDD 49 and an FDD 50 serving as a plurality of image recording means for expanding an image signal read by the second host computer 45 and recorded on the IC memory card 40 or a compression image signal recorded on the IC memory card 40, to record a played-back playback image signal, a CRT 51 serving as display means for displaying an image signal or a playback image signal, and a K.B 52 serving as input means for assigning processing contents to the second host computer 45. The second host computer 45 controls the card interface 46 for connecting the DAT 48, the HDD 49, the FDD 50, the image expansion unit 47 and the IC memory card 40, on the basis of the input from the K.B 52.

Figure 14:
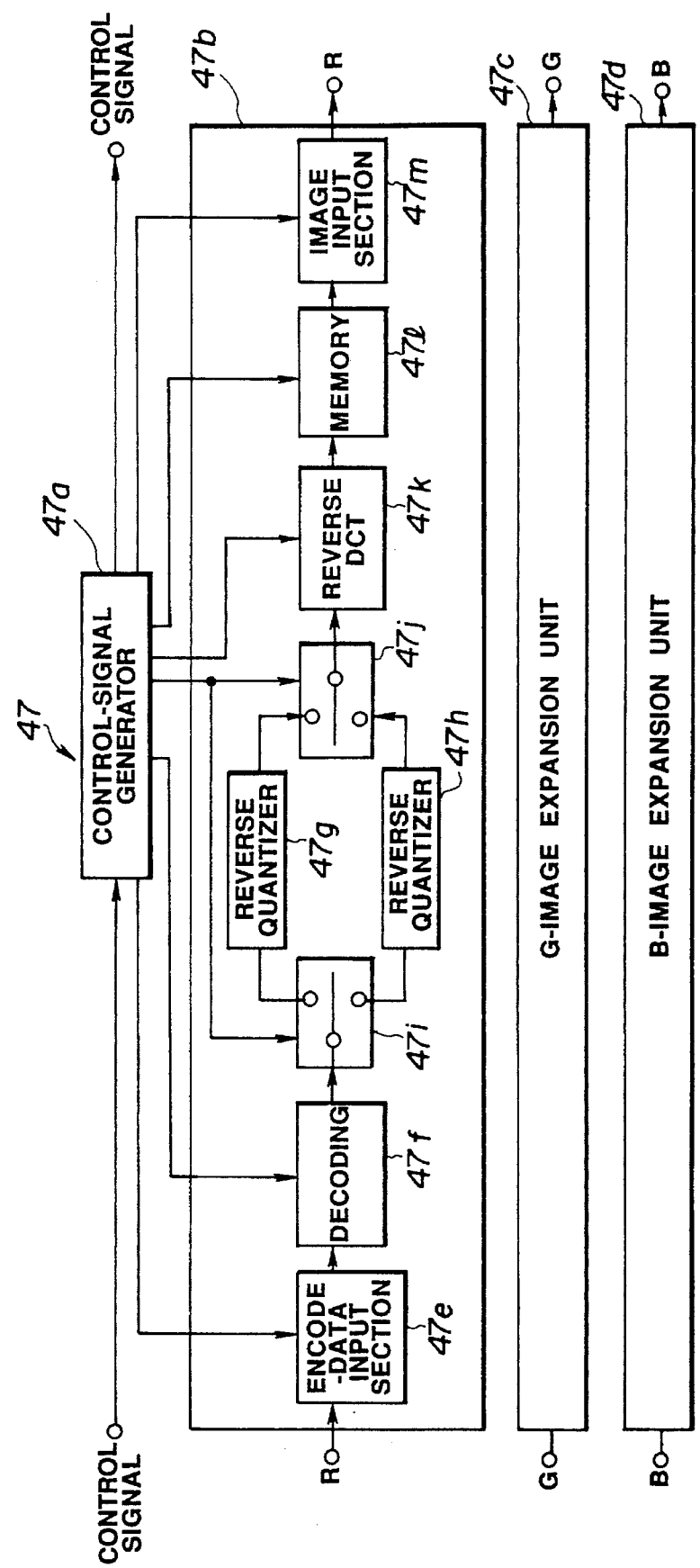

As shown in FIG. 14, the image expansion unit 47 comprises a control signal generator 47a for generating a control signal used within the image expansion unit 47 by a control signal from the second host computer 45, and an R-image expansion unit 47b, a G-image expansion unit 47c and a B-image expansion unit 47d for expending encoded data of R, G and B compressed by the image compression unit 36 recorded on the IC memory card 40. Here, the R-Image expansion unit 47b will be described. However, the same is applicable also to the G-image expansion unit 47c and the B-image expansion unit 47d.

The R-image expansion unit 47b comprises an encoding data input section 47e which is connected to the second host computer 45 and into which R-encoding data compressed by the image compression unit 36 recorded on the IC memory card 40 are inputted, a decoder 47f for decoding the R-encoding data through the encoding data input section 47e, a normal image inverse quantizer 47g and a dyeing image inverse quantizer 47h for inverse-quantizing quantization data through the quantized decoder 47f, a third switch 47i for switching the normal-image inverse-quantizer 47g and the dyeing-image inverse-quantizer 47h by a control signal from the control-signal generator 47a, a fourth switch 47j for inputting in switching thereinto the DCT image data obtained in inverse quantization from the normal image inverse quantizer 47g and the dyeing image inverse quantizer 47h, an inverse DCT converter 47k for inverse-DCT-converting the DCT image data through the fourth switch 47j, a memory 47l for recording the image data obtained in reverse DCT conversion by the reverse DCT converter 47, and an image output section 47m for outputting the image data recorded on the memory 47l to the second host computer 45.

That is, the second host computer 45 is connected to the encoding data input portion 47e of the image expansion unit 47. The encoding data through the encoding data input section 47e are decoded by the decoder 47f, and are inputted to the third switch 47i. The normal image inverse quantizer 47g or the dyeing image inverse quantizer 47h is selected in switching by the switching signal from the control-signal generator 47a. The decoding data from the decoder 47g are inputted into selected one of the normal image reverse quantizer 47g and the dyeing image reverse quantizer 47h. The data outputted from the normal image inverse quantizer 47g or the dyeing image reverse quantizer 47h are inputted to the reverse DCT converter 47k. The inverse DCT converted data are recorded on the memory 47l as image data. The image data recorded on the memory 47l are outputted to the second host computer 45 through the image output section 47m.

Figure 15:
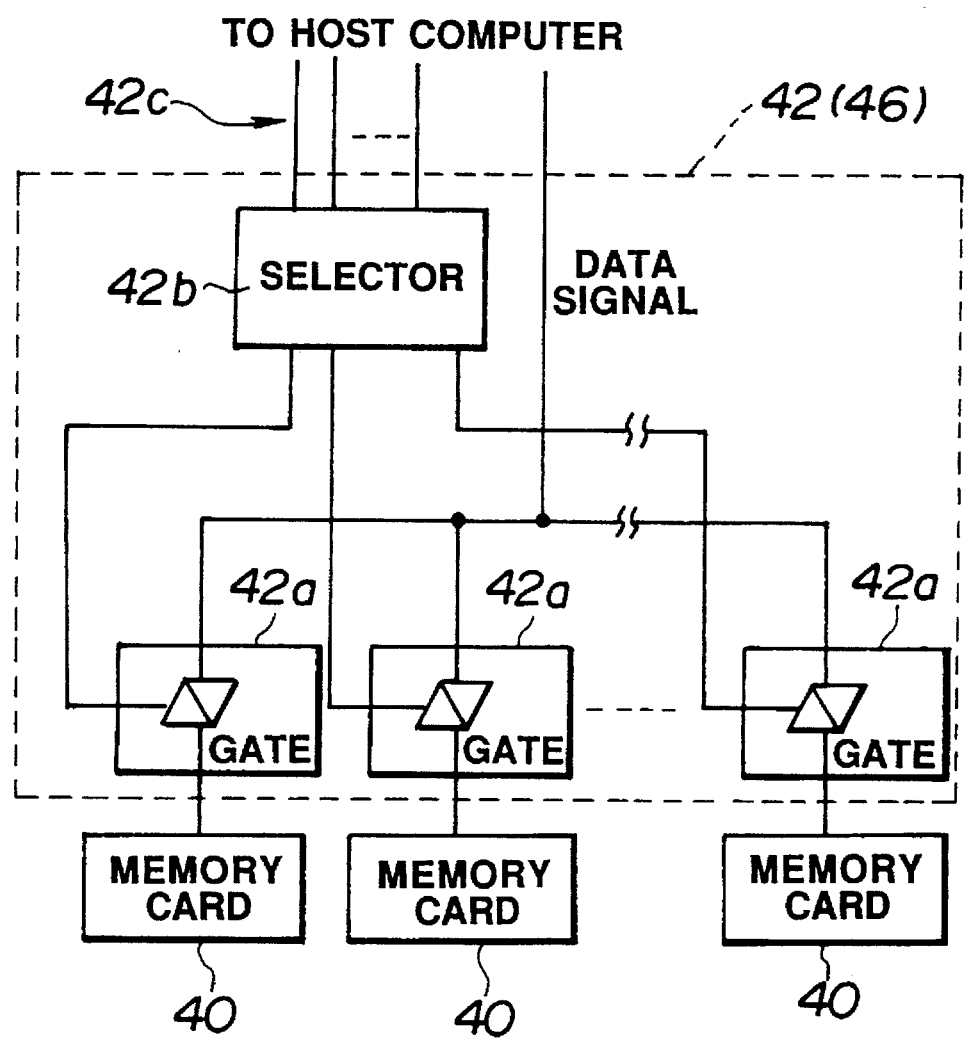

FIG. 15 shows the details of each of the card interfaces 42 and 46. The IC memory card 40 is connected to the host computer 41 or 45 through respective gates 42a capable of switching. In this connection, the IC memory card 40 is easily detachable to the card interface 42. The reference numeral 42b denotes a selector which controls the gates 42a by an address signal 42c inputted from the host computer and which electrically connects one of the plurality of connectable IC memory cards 40 electrically to the host computer.

Figure 16A:
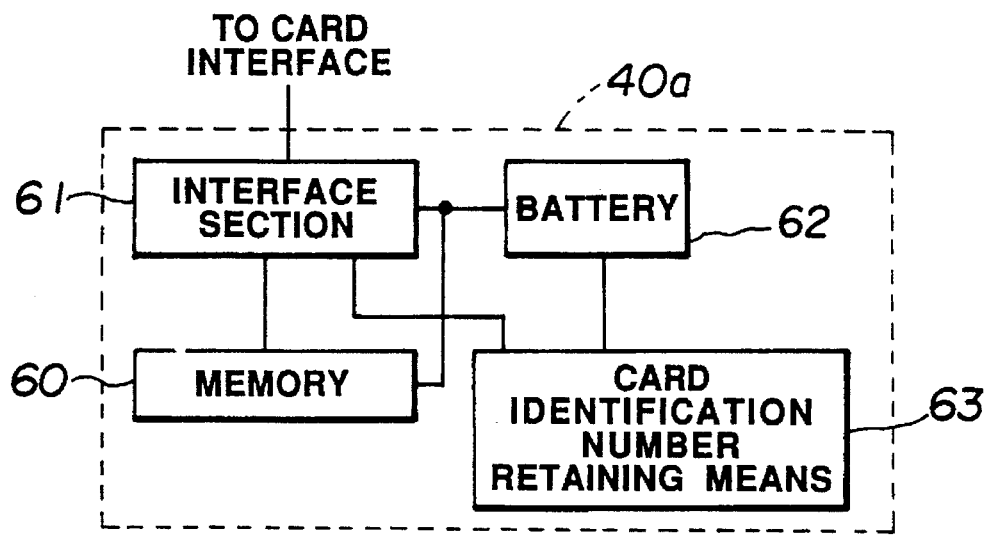
Figure 16B:
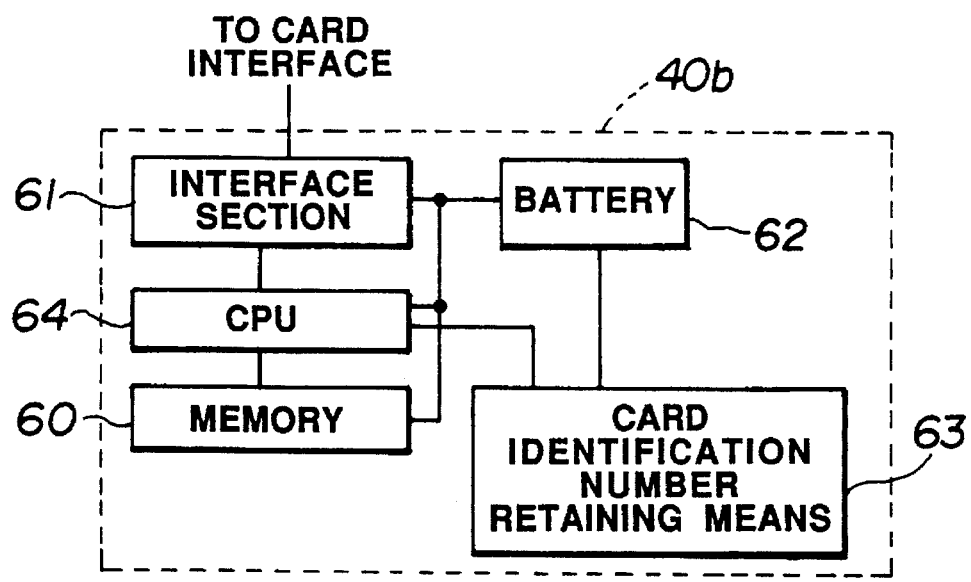

FIGS. 16(a) and 16(b) show the details of the IC memory card. FIG. 16(a) shows an IC memory card 40a having no CPU. The reference numeral 60 denotes a semiconductor memory which is formed by a flash memory or the like continuing to hold recording contents without a power source. The reference numeral 61 denotes an interface section which governs inputting and outputting of data. The reference numeral 62 denotes a battery which is primary or secondary. The reference numeral 63 denotes card identification number means which have their respective values different from each other depending from individual cards. Similarly to the IC memory card of the first embodiment, the card identification number means may be a jumper switch for reading a binary-coded value by an electric switch, for example, or an arrangement in which an identification number is recorded on a non-volatile memory.

FIG. 16(b) shows an IC memory card 40b building therein a CPU 64. Others are the same in arrangement as the IC memory card 40a illustrated FIG. 16(a). The CPU 64 executes management or administration of computation and recorded data. Further, the CPU 64 is capable of operating independently of the host computer. For example, in a case where compression at the aforementioned image compression unit 3 is omitted, it is possible to first store data within the IC memory card 40b by non-compression, and then to subsequently execute compression by the CPU 64.

In connection with the above, although the display means is formed by the CRT, the invention should not be limited to this specific arrangement. The display means may be formed by a monitor such as a color liquid-crystal display unit, a video projector or the like.

Operation of the endoscope image recording apparatus according to the second embodiment, arranged as described above, will be described.

First, the first image recording unit 31 serving as a satellite system mounted in a clinic room is used to execute inspection. An operator inputs patient information such as name or the like by the K.B 34. The patient information is encoded, and is sent to the image input unit 33. Subsequently, the video endoscope 32 is inserted into a location desired to be observed. The video endoscope 32 converts the image-picked-up image to an electric signal and sends the electric signal to the image input unit 33.

The operator depresses the switch 43, to indicate recording of the image. The image information is recorded on both the IC memory card 40 and the DAT 37.

A form or type of the recorded image information will be described by the use of the card recording type and the tape recording type, with reference to FIGS. 17(*a*) and 17(*b*).

FIG. 17(*a*) shows a type of the image information recorded onto the IC memory card 40, while FIG. 17(*b*) shows a type of the image information recorded on the DAT 37. The reference numeral 70 denotes patient information including patient number, patient name, patient date of birth, age, sex distinction, date of inspection, doctor's name of inspection, medical examination and treatment course and the like. The reference numeral 71 denotes image data. The reference numeral 72 denotes a tape identification number, the details of which will be described later. The reference numeral 73 denotes a flag which indicates whether or not display is executed, and default is "not-display". The reference numeral 74 denotes a card identification number which is retained by card identification number means 63 of the IC memory 40.

The aforesaid tape identification number will next be described. The tape identification number has values different from each other depending upon individual media. When a new medium is used for the first time, the identification number is beforehand recorded onto a position of the reference numeral 72 in FIG. 17(*b*).

A process of recording the image will next be described.

The switch 43 is connected to the control section 33*b* of the image input unit 33. By depression of the switch 43, an encoded recording command is outputted to the first host computer 41 by the communication interface section 33*c*. Further, the recording command is again sent to the image compression unit 36.

The first host computer 41 reads the card identification number from the IC memory card 40, and retains the card identification number. Moreover, the first host computer 41 reads the identification number 72 from the tape-type recording unit, and retains the identification number 72.

The image outputted from the image input unit 33 is compressed by the image compression unit 36. The compression is due to the discrete cosine transformation (DCT), as described previously. Since time is required for the compression, it is not necessarily required to execute the compression. There is also a method in which the image is recorded as the original picture. The compressed image is recorded on the IC memory card 40 and the DAT 37 through the first host computer 41. At this time, the tape identification number retained within the first host computer 41 is added to the IC memory card 40 at a location of the reference numeral 72 in FIG. 17(*a*). Furthermore, the card identification number retained within the first host computer 41 is added to the DAT 37 at a position of the reference numeral 74 in FIG. 17(*b*).

The above-described recording is repeated to execute consecutive inspection.

A case where the DAT 37 is used has been described. However, a recording unit using 8 mm video tape as a medium in which the medium is changeable or replaceable may be used. Further, such recording unit of tape type has widely been used. For example, the recording unit of tape type is low in speed as compared with a disc-type recording unit such as a floppy disc, a hard disc or the like. Since, however, the recording unit of tape type is large in capacity, the recording unit of tape type is suitable for backup.

Generally, writing to a low-speed external recording unit such as magnetic-tape-type recording unit or the like takes a method in which data are once recorded onto a cash buffer consisting of a semiconductor memory, to wait that the external recording unit becomes capable of writing. In the present unit, it is possible to use the IC memory card 40 serving also as the cash buffer.

As described previously, the plurality of IC memory cards 40 are inserted in the card interface 42. Here, in a case where the images are different in type or kind from each other, it is possible to execute recording to the different IC memory cards 40. For example, if information of the inspection doctor is included in the identification number of the IC memory card 40, recording is automatically executed in a manner split to the respective IC cards 40. It is possible for each inspection doctor to demount the IC memory card 40 to take away the same, without interruption of inspection due to other doctor.

Furthermore, it is possible to execute transmission of data between the IC memory cards 40 at a high speed.

The IC memory card 40 completed in inspection is carried to the second image recording unit 44 serving as a conference system which is arranged within the display room illustrated in FIG. 9(*b*). Operation of the second image recording unit 44 serving as the conference system will hereunder be described by the use of FIG. 9(*b*).

In the second image recording unit 44, management or administration and display of the image information recorded at inspection are executed. The recorded IC memory card 40 carried by the first image recording unit 31 serving as a satellite system is inserted into the card interface 46. The image information recorded on the IC memory card 40 1s transmitted to the HDD 49 through the second host computer 45 and the image expansion unit 47 by trigger due to the K.B 52. Here, at the image expansion unit 47, expansion of the image executed by the image compression unit 36 is executed.

Figure 18:
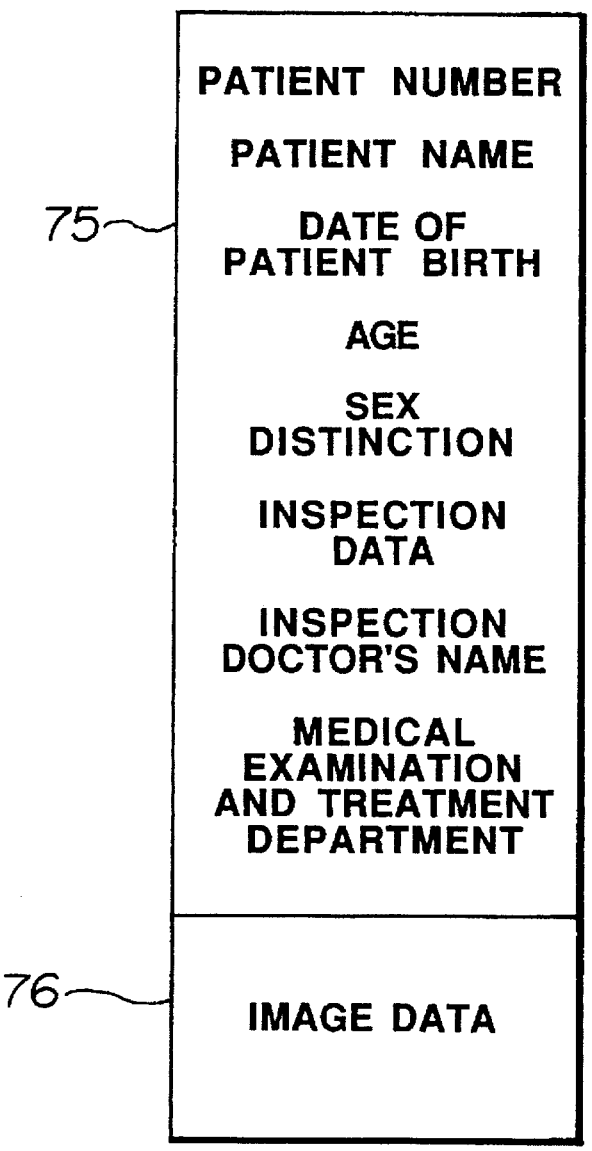

The above-described operation is repeated so that the image information is successively stored in the HDD 49 through the IC memory card 40. FIG. 18 shows a recording type of the HDD 49. The reference numeral 75 denotes patient information, while the reference numeral 76 denotes image data.

A case where the image information on the IC memory card 40 is eliminated or disappeared at process of being carried to the second image recording unit 44 will be described. The disappeared image information is recorded onto the DAT 37 of the first image recording unit 31 simultaneously with the IC memory card 40. A tape-type medium of the DAT 37 recorded at the DAT 37 is reproduced or played back by the DAT 48 of the second image recording unit 44, and the disappeared image information is transmitted to the HDD 49 through the second host computer 45 and the image expansion unit 47.

Figure 19:
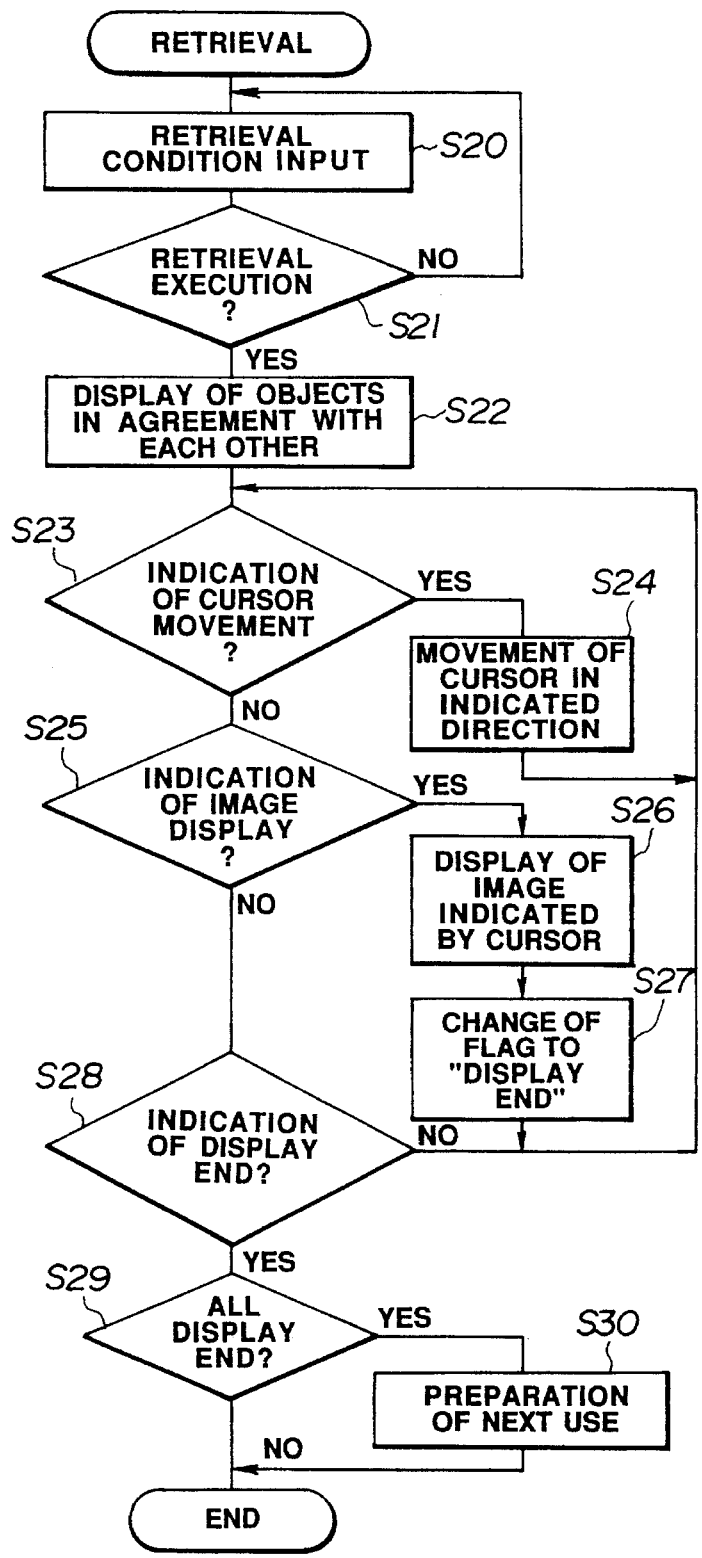

A flow chart in FIG. 19 is used to next describe operation of retrieval and display of the image information at the second image recording unit 44.

In S20, the operator inputs retrieval conditions to the second host computer 45 by the K.B 52.

Display as illustrated in FIG. 20 is executed at once on the CRT 51 in accordance with the input. The reference numeral 80 denotes the retrieval conditions, while the reference numeral 81 denotes a cursor.

Further, in S21, the operator indicates executing of retrieval to the second host computer 45 by the K.B 52.

In S22, the second host computer 45 retrieves the image data within the IC memory card 40, selects ones which are in agreement with the inputted conditions, and displays the selected ones on the CRT 51 as illustrated in FIG. 21. The reference numeral 82 denotes a row of ones which identify the image information in agreement with each other. The ones which identify the image information are ones which are surely identifiable. For example, the ones which identify the image information includes inspection number, inspection date, patient name, sex distinction and the like. The reference numeral 83 denotes a cursor. In S23, the operator gives an indication moving the cursor by the K.B 52, to the second host computer 45. Furthermore, in S25, when an indication of the image display is given by the K.B 52, display of the image indicated by the cursor is executed at a position denoted by the reference numeral 84. Here, the flag 73 of the IC memory card 40 within the image information which executes display of the image is changed to "display end".

The above-described operation is executed repeatedly, to execute display of inspection data.

If display of all the image information within the IC memory card 40 ends, the IC memory card 40 finishes a series of duties or functions extending from the first image recording unit 31 to the second image recording unit 44, and prepares for a next use. For example, it is required that a flash memory eliminates or erases the past data prior to execute writing.

In a case where display ends, an indication of display end is given by the K.B 52 in Step 28. In Step 29, it is investigated whether or not the display of all the image information in the IC memory card 40 ends. If the display of all the image information in the IC memory card 40 ends, preparation is made for next new recording of the image information. Here, it is discriminated whether or not the display ends, based on the flag 73 of the IC memory card 40 in the image information.

In this manner, similarly to the first embodiment, the endoscope image recording apparatus according to the second embodiment records the endoscope image onto the IC memory card and the DAT tape and, simultaneously, records the identification code of the DAT tape onto the IC memory card, and records the identification code of the IC memory card onto the DAT tape. Accordingly, when the IC memory card is used to send the image data from the first image recording unit to the second image recording unit, in a case where the image data of the IC memory card are damaged, the identification code of the IC memory card recorded on the DAT tape is retrieved, whereby there can be produced an advantage that the damaged image data can easily be returned or restored. Further, since the image data are recorded also on the HDD or the like, it is possible to administer the data further reliably. In this connection, the image data can also be returned from the IC memory card, similarly at damage of the image data on the DAT card.

A third embodiment of the invention will next be described.

The third embodiment is directed to an image recording apparatus which is arranged such that a 3.5 inch photo-electro-magnetic disc is used for portable image recording means, and normal image recording means uses a postscript-type photo disc.

Figure 22:
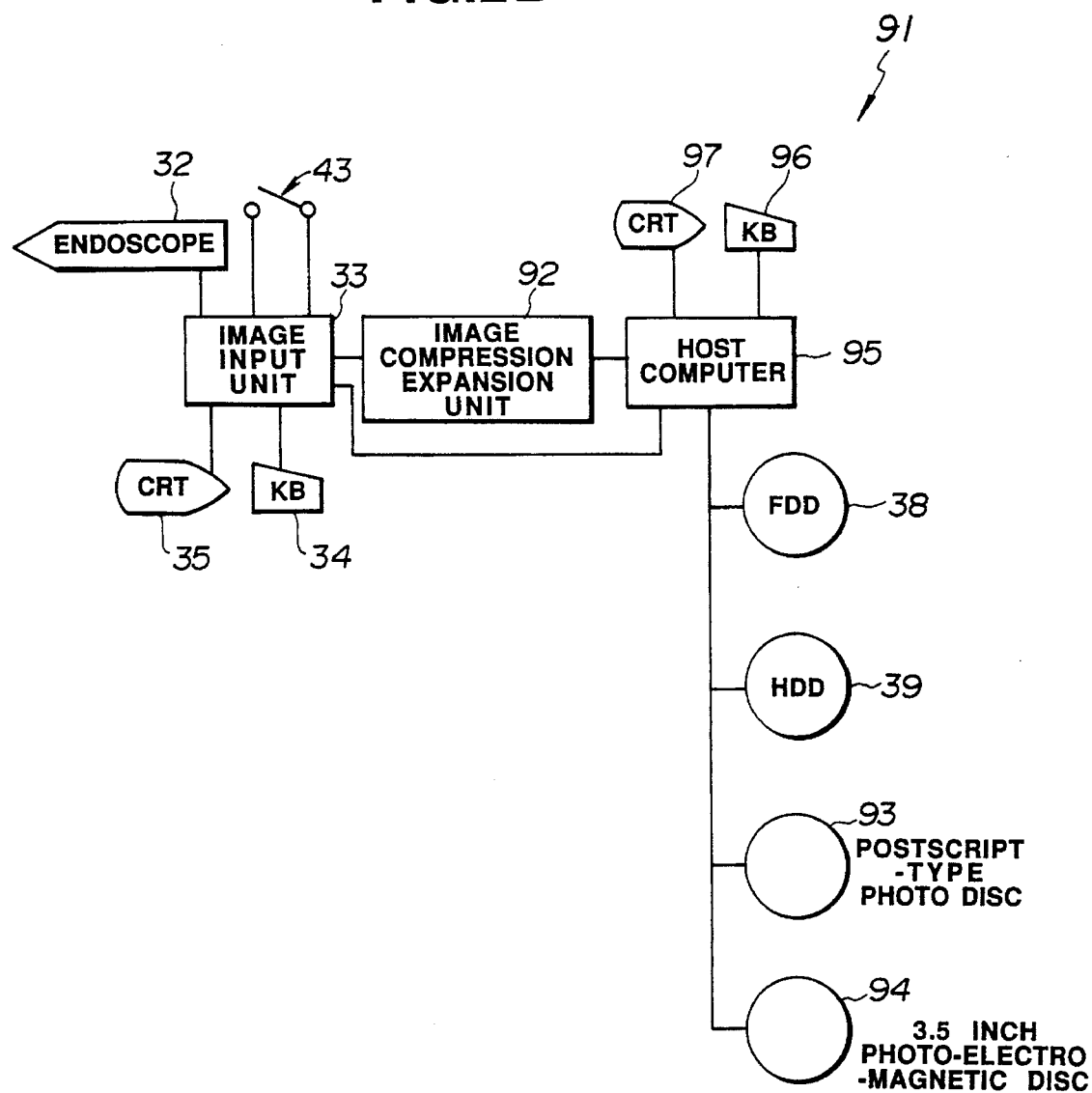
FIGS. 22 through 26 are views showing a third embodiment of the invention, FIG. 22 being an arrangement view showing a structure of an endoscope image recording apparatus, FIG. 23 being a recording format of image data executed on a information recording medium, FIG. 24 being an explanatory view describing a structure of a data base, FIG. 25 being a flow chart showing a flow of retrieval processing of the image information due to the data base, and FIG. 26 being an explanatory view describing display contents of the CRT at retrieval processing of the image information.

As shown in FIG. 22, an image recording unit 91 according to the third embodiment of the invention comprises a video endoscope 32 having, at a forward end of an inserting section, an image pickup element, for observing the interior of a body cavity or the like, an image input unit 33 for signal-processing a picture image signal from the video endoscope 32 to generate an image signal, a keyboard (hereinafter simply referred to as "K.B") 34 into which information of a patient observed is inputted and which serves as input means for assigning processing contents to the image input unit 33, a CRT 35 serving as display means for displaying the image signal generated by the image input unit 33, an image compression expansion unit 92 for compressively expanding the image signal generated by the image input unit 33, and a plurality of image recording means for recording the image signal generated by the image input unit 33 or the compressed image signal compressed by the image compression expansion unit 92.

The plurality of image recording means include a disc-type recording unit, for example, a hard disc drive (hereinafter simply referred to as "HDD") 38, a floppy disc drive (hereinafter simply referred to as "FDD") 39, a postscript-type photo disc 93 and a 3.5 inch photo-electro-magnetic disc 94.

Furthermore, the image recording apparatus 91 according to the third embodiment comprises a host computer 95 for executing control of recording an image signal generated by the image input unit 33 or a compression signal compressed by the image compression and expansion unit 92 in the plurality of image recording means, and for executing control of playing back the recorded image signal or generating in expansion the compression image signal, and a button-type switch 43 for fetching an image recorded onto the image input unit 33. A K.B 96 and a CRT 97 are connected to the host computer 95 so as to be capable of indicating retrieval of the recorded Image information to the plurality of image recording means.

Figure 23A:
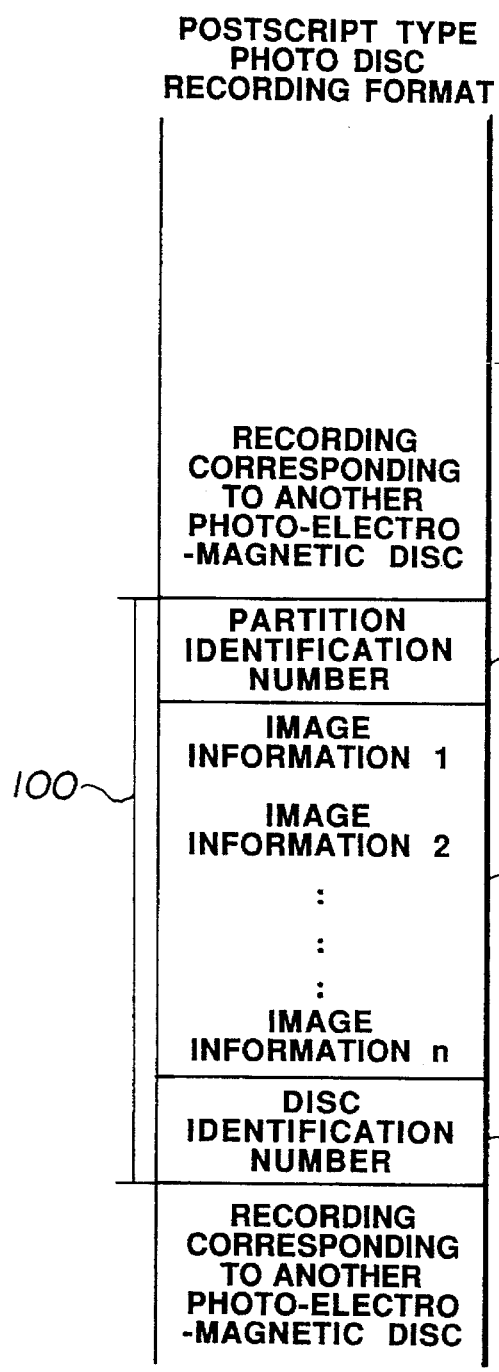

As shown in FIG. 23(a), the postscript-type photo disc 93 is used in such a manner that the recording region recording the image information is divided into a plurality of partitions 100. Each of the partitions 100 is divided into a first identification region 101, an image information region 102, and a second identification region 103. A partition identification number that is a value different from other partitions on the same disc and all the partitions on the other disc is recorded on the first identification region 101. Moreover, a disc identification number that is a value different from other discs is recorded on the second identification region 103. In this connection, the partition identification number and the disc identification number are beforehand recorded on the first identification region 101 and the second identification region 103, respectively, when the respective discs are used for the first time, and are so used as to distinguish the partition and the disc from other partitions and discs.

Figure 23B:
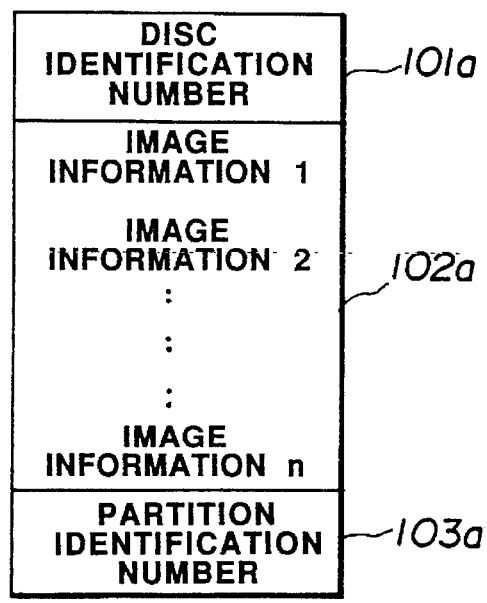

As shown in FIG. 23(b), the 3.5 inch photo-electro-magnetic disc 94 is similarly divided into a first identification region 101a, an image information region 102a and a second identification region 103a. A disc identification number that is a value different from other discs is recorded on the first identification region 101a, while a partition identification number of the postscript-type photo disc is recorded on the second identification region 102a by a method to be described subsequently.

Image information recorded on the image information region 102 of the postscript-type photo disc 93 and image information recorded on the image information region 102a of the 3.5 inch photo-electro-magnetic disc 94 may be image information in which one or both is/are encoded, if the image information is obtained from the same image. In a case where both are encoded image information, methods of encoding may be different from each other.

Operation of the third embodiment arranged as described above will be described.

The video endoscope transmits the image-picked-up image to the image input unit. The operator indicates recording of the image by the switch 43. The image to be recorded is subsequently written to the 3.5 inch photo-electro-magnetic disc 94. In this connection, the arrangement may be such that the image to be recorded is once stored in a memory (not shown) within the host computer 95, and is written to the 3.5 inch photo-electro-magnetic disc 94 together at completion of inspection.

Backup of the image information will next be described.

At the time the image information region 102a of the 3.5 inch photo-electro-magnetic disc 94 becomes full, or at the time an end is put to the work such as an end of day or the like, the image information recorded on the 3.5 inch photo-electro-magnetic disc 94 is copied to the postscript-type photo disc 93. At that time, the disc identification number recorded onto the first identification region 101a of the 3.5 inch photo-elector-magnetic disc 94 is written to the second identification region 103 of the postscript-type photo disc 93, and the partition identification number recorded on the first identification region 101 of the postscript-type photo disc 93 is written to the second identification region 103a of the 3.5 inch photo-electro-magnetic disc 94.

In connection with the above, a process from image pickup to backup may be as follows: That is, the video endoscope transmits the image-picked-up image to the image input unit. The operator indicates recording of the image by the switch 43. The images to be recorded are subsequently written to the postscript-type photo disc 93. In this connection, the arrangement may be such that the image to be recorded is once stored in the memory (not shown) within the host computer 95, and are written to the postscript-type photo disc 93 together at completion of inspection. At the time an end is superiorly left off, the image information recorded on the postscript-type photo disc 93 is copied to the 3.5 inch photo-electro-magnetic disc 94. At that time, the partition identification number recorded on the first identification region 101 of the postscript-type photo disc 93 is written to the second identification region 103a of the 3.5 inch photo-electro-magnetic disc 94, and the disc identification number recorded onto the first identification region 101a of the 3.5 inch photo-electro-magnetic disc 93 is written to the second identification region 103 of the postscript-type photo disc 93.

Figure 24:
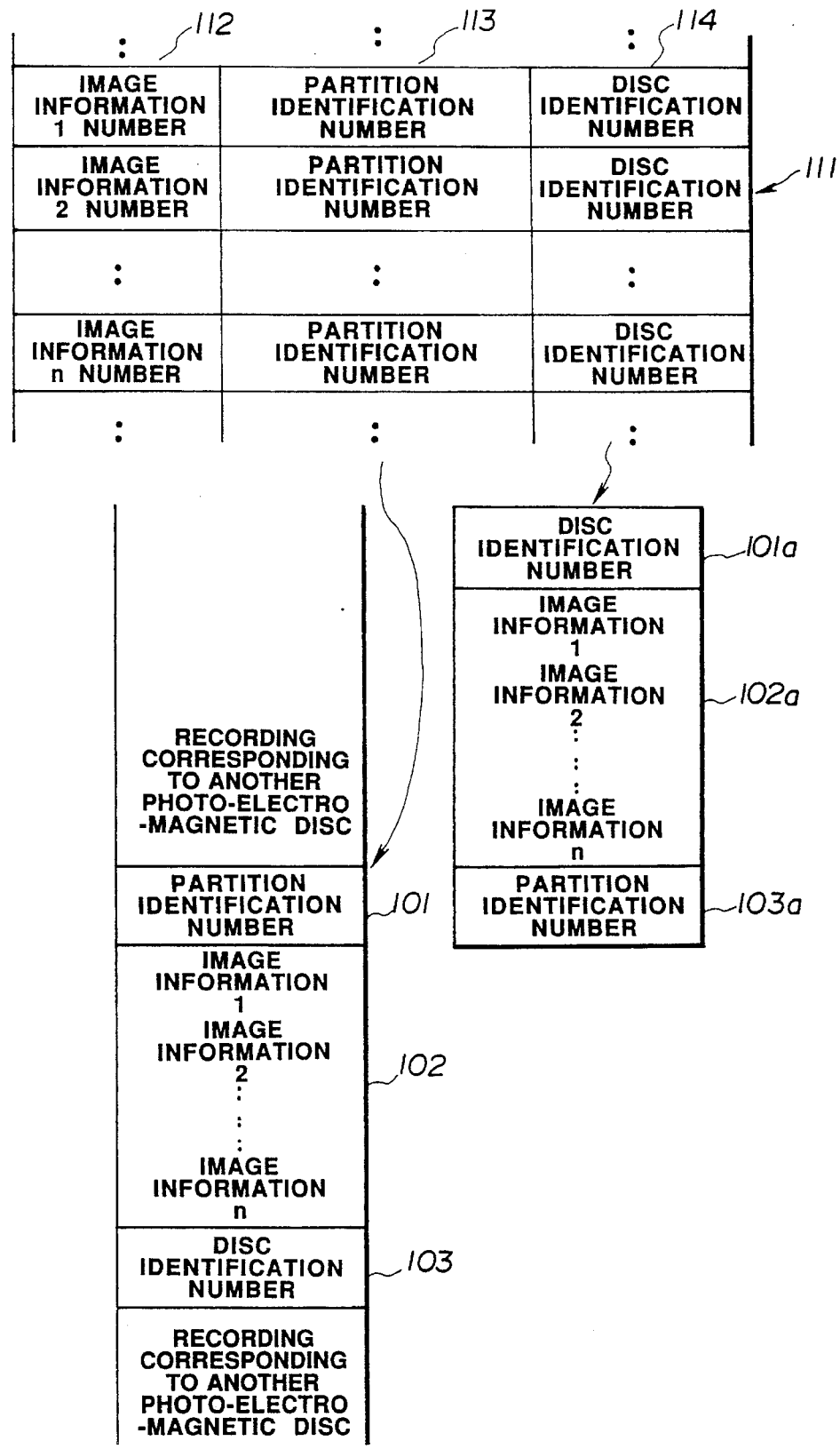

Management or administration of the image information recorded in this manner is executed by the use of a data base 111 as illustrated in FIG. 24. The data base 111 has a plurality of management regions including an image management region 112, a partition management region 113 and a disc management region 114. The data base 111 is provided on the FDD 37 or the HDD 39 under control of the host computer 95. An image information number corresponding to the image information recorded on the postscript-type photo disc 93 and the 3.5 inch photo-electro-magnetic disc 94 is recorded onto the image management region 112. A number corresponding to the partition identification number on the partition of the postscript-type disc 93 on which the image information corresponding to the image information number recorded on the image management region 112 exists is recorded on the partition management region 113. Furthermore, a number corresponding to the disc identification number of the 3.5 inch photo-electro-magnetic disc 94 on which the image information corresponding to the identification number recorded on the image management region 112 exists is recorded on the disc management region 114. The data base 111 is updated at the time backup is executed.

Figure 25:
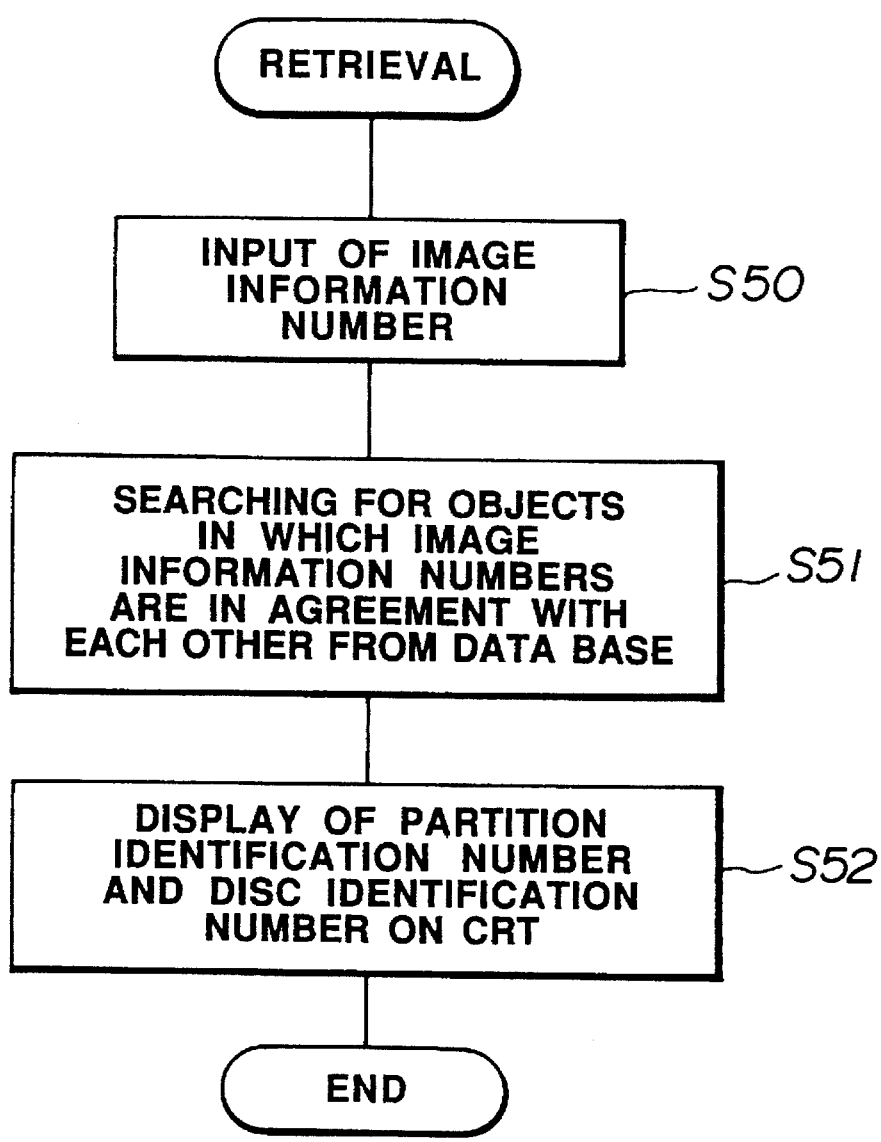
Figure 26A:
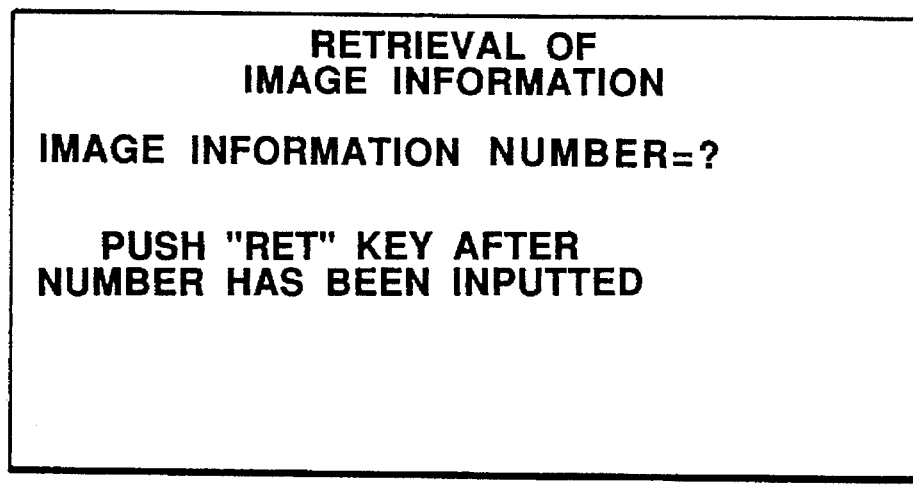
Figure 26B:
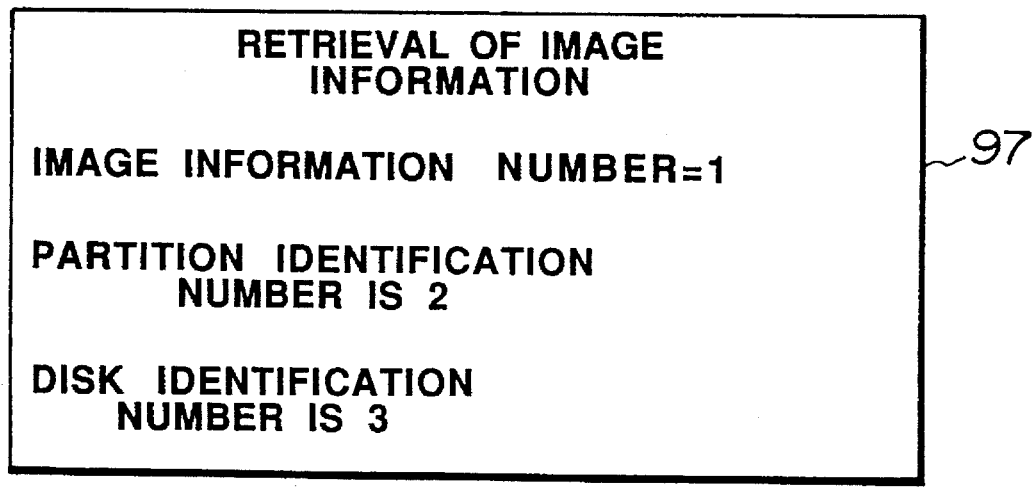

Retrieval of the image information by the use of such data base 111 will be described. As shown in FIG. 25, an operator uses the K.B 96 to input the image information number in S50. Display contents of the CRT 97 at this time are shown in FIG. 26(*a*). Subsequently, the host computer 95 retrieves, in S51, the inputted image information number by the data base 111, to thereby search for the image management region 112 in which the image information number is recorded. In S52, the partition management region 113 and the disc management region 114 adjacent to the retrieved image management region 112 are read whereby the partition identification number and the disc identification number in which the image information exists are displayed on the CRT 97 (FIG. 26(*b*)). Processing ends.

In this manner, in the third embodiment of the invention, the postscript-type photo disc and the 3.5 inch photo-electro-magnetic disc are used as the image recording means so that their respective identification codes are recorded. Accordingly, similarly to the first and second embodiments of the invention, even if one is damaged so that the image information is quenched, it is possible to produce the image information by the other. Since the respective identification codes are managed by the data base together with the image management information, it is possible to execute retrieval of the image information simply and quickly.

In connection with the above, in each of the above-described embodiments, the image information recording apparatus has been arranged by the use of the IC memory card or the 3.5 inch photo-electro-magnetic disc which is arranged by the semiconductor memory as the portable image recording means. However, the invention should not be limited to this specific arrangement. For example, the portable image recording means may be arranged by a photo-electro-magnetic disc whose size is 5.25 inch or 12 inch, by an photo disc whose size is 3.5 inch, 5.25 inch or 12 inch, by a floppy disc whose size is 3.5 inch, 5.25 inch or 8 inch, by a data tape of Cartridge type, by a partial hard disc drive manufactured on the assumption of portability, or the like.

In this invention, it will be apparent that different embodiments can be formed in a broad scope on the basis of the invention without departing a spirit and a scope of the invention. The invention should not be limited by specific embodiments other than being limited by appended claims.

What is claimed is:

1. An image information recording apparatus comprising:
   a plurality of image information recording means for identically recording image data, said image data including one of an image signal and image information in which the image signal is encoded, each of said plurality of image information recording means respectively having recording media on which said image data is stored, and each respective said recording media having a unique identification number recorded therein, said recording media including an IC memory card and a DAT tape, and said image data is identically recorded to both said IC memory card and said DAT tape;
   identification information generating means for obtaining said unique identification number for each of said plurality of image information recording means; and recording control means for storing on each respective one of said recording media said unique identification number of other ones of said recording media together with said image data;

wherein at least one of said recording media is a removable recording media; and wherein said recording control means applies said unique identification number to said image information at the time said image data is simultaneously recorded by each of said plurality of image information recording means, and wherein simultaneously said unique identification number of said DAT tape is recorded onto the IC memory card and the unique identification number of the IC memory card is recorded onto the DAT tape;

said image information recording apparatus further comprising retrieval means for retrieving said image data from a selected one of said plurality of image information recording means, and, when said image data from said selected one of said plurality of image information recording means is damaged, for reading said unique identification number for said image data in said selected one of said plurality of image information recording means to identify a specific one of said recording media for another one of said plurality of image information recording means which contains said image data, whereby said image data can be quickly retrieved.

2. An image information recording apparatus according to claim 1, further comprising:

image pickup means for picking up a subject; and image signal generating means for generating said image signal on the basis of an image pickup signal from said image pickup means.

3. An image information recording apparatus according to claim 2, wherein said image pickup means is an endoscope which is inserted into one of a body cavity and a tube to image-pickup the subject.

4. An image information recording apparatus according to claim 1, wherein at least one of said plurality of image information recording means has memory capacity larger than recording capacity of said portable information recording medium on which said portable information recording means records.

5. An image information recording apparatus according to claim 2, comprising:

information playback means for playing back said image information and said identification information which are recorded on said plurality of image information recording means.

6. An image information recording apparatus according to claim 5, comprising:

input means for inputting said identification information; and retrieving means for playing back said identification information inputted from said input means by said image pickup means, to thereby retrieve said image information.

7. An image information recording apparatus according to claim 6, wherein at least one of said plurality of image information recording means is provided with a management information region for managing the recorded identification information, and said retrieving means retrieves said management information region.

8. An image information recording apparatus according to claim 1, further comprising:

separating means for separating said image signal into a plurality of color image signals different in cyclic region from each other, wherein said plurality of image information recording means record one of said color image signal and image information in which said color image signal is encoded.

9. An image information recording apparatus according to claim 1 or claim 8, wherein said image information in which said image signal is encoded is compression image information in which said image signal is compressed.

10. An image information recording apparatus according to claim 9, wherein said image signal includes a dyeing image signal.

11. An image information recording apparatus according to claim 10, further comprising a means for varying a quantization level on the basis of a kind of said image signal.

12. An image information recording apparatus according to claim 9, further comprising:

expansion playback means for expanding said compression image information to play back the same.

13. An image information recording apparatus according to claim 1, wherein said identification information includes an information code relating to said image information.

14. An image information recording apparatus according to claim 1, wherein said portable information recording medium recorded on by said portable information recording means includes signal processing means for signal-processing said image information and an IC card provided with a semiconductor memory storing therein the signal-processed image information.

15. An image information recording apparatus according to claim 1, wherein said portable information recording medium recorded on by said portable information recording means is a photo-electro-magnetic disc.

16. An image information recording and retrieving method for simultaneously recording image data on a plurality of recording media, each of the recording media respectively having a unique identification number, comprising the steps of:

simultaneously recording image data, which includes one of an image signal and image information in which said image signal is encoded, to a plurality of image information recording means which respectively each have portable information recording media for recording the image data thereon, at least one of said recording media being removable and portable, wherein said plurality of recording media includes an IC memory card and a DAT tape, and said image data is recorded to both said IC memory card and said DAT tape;

generating identification information by obtaining said unique identification number for each respective recording media of said plurality of image information recording means;

appending to said image data on each said recording media said unique identification number of another one of said recording media;

wherein said unique identification number is appended by the recording control means to the image data at the time said image data is recorded by the plurality of image information recording means, and wherein simultaneously the unique identification number of said DAT tape is recorded onto the IC memory card and the unique identification number of the IC memory card is recorded to the DAT tape;

and said image information recording and retrieving method further comprising the step of retrieving said image data by a retrieval means from a selected one of said plurality of image information recording means, and, when said image data from said selected one of said plurality of image information recording means is damaged, reading said unique identification number for said image data in said selected one of said plurality of image information recording means to identify a specific one of said recording media for another one of said plurality of image information recording means which contains said image data, whereby said image data can be quickly retrieved.

17. An image information recording method according to claim 16, further comprising:

the step of image-picking up a subject in the form of an image pick-up signal by an image pick-up means; and the step of generating said image signal based on said image pick up signal from said image pickup means.

18. An image information recording method according to claim 16, further comprising:

the step of playing back said image information with an image playback means and said identification information recorded on said plurality of image information recording means.

19. An image information recording method according to claim 18, further comprising:

the step of inputting said identification information with an input means; and the step of playing back said identification information inputted by said input means, by said image playback means, to thereby retrieve said image information.

20. An image information recording method according to claim 19, wherein at least one of said plurality of image information recording means is provided with a managing information region for managing the recorded identification information, and said playing back step retrieves said management information region.

* * * * *